United States Patent
Erickson et al.

(10) Patent No.: US 8,276,879 B2
(45) Date of Patent: Oct. 2, 2012

(54) BEVERAGE FAUCET LEVER, TAP MARKER MOUNTING DEVICE USING BEVERAGE FAUCET LEVER AND ASSOCIATED BEVERAGE FAUCET AND METHOD FOR USING THE SAME

(75) Inventors: Brian Lee Erickson, Holland, MI (US); Jason William Spaulding, Holland, MI (US)

(73) Assignee: Dual Gravity, LLC, Holland, MI (US)

( * ) Notice: Subject to any disclaimer, the term of this patent is extended or adjusted under 35 U.S.C. 154(b) by 1175 days.

(21) Appl. No.: 12/009,238

(22) Filed: Jan. 17, 2008

(65) Prior Publication Data

US 2008/0230732 A1 Sep. 25, 2008

Related U.S. Application Data

(60) Provisional application No. 60/880,843, filed on Jan. 17, 2007, provisional application No. 60/966,130, filed on Aug. 25, 2007.

(51) Int. Cl.
*F16K 31/44* (2006.01)
(52) U.S. Cl. .......................................... 251/231; 40/332
(58) Field of Classification Search .......... 251/120–122, 251/231, 369; 137/600; 40/331–332
See application file for complete search history.

(56) References Cited

U.S. PATENT DOCUMENTS

| | | | |
|---|---|---|---|
| 2,066,877 A | 1/1937 | Cruver | |
| 2,125,102 A | 7/1938 | Cornelius | |
| 2,270,932 A | 1/1942 | Cornelius | |
| 2,295,468 A | 9/1942 | Haley | |
| 2,340,135 A | 1/1944 | Merritt | |
| 2,373,924 A * | 4/1945 | Tompkins | 123/274 |
| 2,575,658 A | 11/1951 | Nero | |
| 2,580,666 A | 1/1952 | Dzus | |
| 2,631,393 A * | 3/1953 | Hetherington | 40/332 |
| 2,899,170 A | 8/1959 | Cornelius | |
| 3,233,631 A | 2/1966 | Cornelius | |
| 3,291,441 A | 12/1966 | Hansen | |
| 3,612,354 A | 10/1971 | Sitton | |
| 3,762,086 A | 10/1973 | Horbinski | |
| 4,271,992 A * | 6/1981 | Becker | 222/509 |
| 5,050,806 A | 9/1991 | Anderson et al. | |
| 5,412,547 A * | 5/1995 | Hornblad et al. | 362/183 |
| 5,564,461 A * | 10/1996 | Raymond et al. | 137/315.35 |
| 6,041,970 A | 3/2000 | Vogel | |
| 6,230,769 B1 * | 5/2001 | O'Brien | 141/362 |
| 6,543,959 B1 | 4/2003 | Jore | |
| 6,932,638 B1 | 8/2005 | Burrows et al. | |
| 2004/0069966 A1 * | 4/2004 | Amidzich | 251/231 |
| 2005/0029309 A1 | 2/2005 | Forsyth | |

* cited by examiner

*Primary Examiner* — John Bastianelli
(74) *Attorney, Agent, or Firm* — King & Partners, PLC

(57) ABSTRACT

A beverage faucet lever comprising: an upper shaft, wherein the upper shaft comprises a tap marker alignment member, and wherein the upper shaft comprises a lip for engaging a tab of a tap marker mounting device, and further wherein the upper shaft is at least partially positionable within a tap marker mounting device; a lower shaft, wherein the lower shaft comprises an actuator and wherein the lower shaft is at least partially positionable within a beverage faucet; and a ball joint positioned between the upper shaft and the lower shaft, wherein the ball joint is at least partially positionable within a beverage faucet.

13 Claims, 7 Drawing Sheets

BEVERAGE FAUCET LEVER, TAP MARKER MOUNTING DEVICE USING BEVERAGE FAUCET LEVER AND ASSOCIATED BEVERAGE FAUCET AND METHOD FOR USING THE SAME

CROSS-REFERENCE TO RELATED APPLICATION(S)

This application claims the benefit of United States Provisional Application Ser. No. 60/880,843, filed Jan. 17, 2007, entitled "TAP MARKER MOUNTING DEVICE PROVIDING QUICK CONNECTION AND ALIGNMENT," and United States Provisional Application Ser. No. 60/966,130, filed Aug. 25, 2007, entitled "TAP MARKER MOUNTING DEVICE PROVIDING QUICK CONNECTION, ALIGNMENT, AND REVERSE COMPATIBILITY," which are hereby incorporated herein by reference in their entirety, including all references cited therein.

BACKGROUND OF THE INVENTION

1. Field of the Invention

The present invention relates in general to a beverage faucet lever and tap marker mounting device, which allow a user to quickly connect and controllably align beverage tap markers.

2. Background Art

Tap marker mounting devices have been known in the art for years. Conventional tap marker mounting devices come in a variety of sizes and shapes and are fabricated from several types of materials, though all perform the same general functions of identification and marketing of beverage products. To be sure, while correct placement and positioning of tap markers can be critical to the marketing of a beverage in an establishment, to the best of Applicants' knowledge, current tap marker mounting devices do not provide a user with the ability to easily install and controllably position tap markers.

To the best of Applicants' knowledge, typical tap markers comprise a tapped bore that is threaded onto a standard lever. The tap marker is locked into place and a specific rotational position is established via a faucet collar. Conventional tap markers provide no alignment mechanisms which fix the tap marker in the proper and/or pre-selected position. Consequently, many tap markers are installed incorrectly leading to improper positioning, thus defeating the primary purpose of the tap marker.

Lastly, establishments that offer a wide variety of beverages often re-position, remove, and/or interchange tap markers. Routine maintenance of faucets normally requires the frequent removal of tap markers as well. Currently, conventional tap markers do not provide a quick and efficient connection to standard faucet levers, rendering them difficult and time consuming to remove, align and/or replace. Also, conventional threaded components in tap markers are susceptible to cross threading if care is not taken to align the threads of the beverage faucet lever and tap marker properly. Consequently, a careless or hurried barkeeper can potentially ruin both the tap marker and the beverage faucet lever.

It is therefore an object of the present invention to provide a beverage faucet lever, a tap marker mounting device, and/or a beverage faucet, to remedy one or more of the aforementioned drawbacks associated with conventional beverage hardware.

These and other objects of the present invention will become apparent in light of the present specification, claims, and drawings.

SUMMARY OF THE INVENTION

The present invention is directed to, among other things, a beverage faucet lever, comprising: (a) an upper shaft, wherein the upper shaft comprises a tap marker alignment member, and wherein the upper shaft comprises a lip for engaging a tab of a tap marker mounting device, and further wherein the upper shaft is at least partially positionable within a tap marker mounting device; (b) a lower shaft, wherein the lower shaft comprises an actuator, and wherein the lower shaft is at least partially positionable within a beverage faucet; and (c) a ball joint positioned between the upper shaft and the lower shaft, wherein the ball joint is at least partially positionable within a beverage faucet.

In a preferred embodiment of the present invention, the tap marker alignment member comprises a slot positioned on a top surface of the upper shaft.

In another preferred embodiment of the present invention, the tap marker alignment member comprises a plurality of slots positioned on a top surface of the upper shaft.

In yet another preferred embodiment of the present invention, the tap marker alignment member comprises a pair of substantially orthogonal slots positioned on a top surface of the upper shaft.

In another aspect of the present invention, the tap marker alignment member comprises a top surface of the upper shaft having a cross-sectional geometry selected from the group comprising triangular, square, rectangular, pentagonal, hexagonal, octagonal, and combinations thereof. In this embodiment the tap marker alignment member preferably comprises a top surface of the upper shaft having a polygonal cross-sectional geometry.

In a preferred embodiment of the present invention, at least a portion of the upper shaft is threaded.

The present invention is further directed to, among other things, a beverage faucet, comprising: (a) a housing, wherein the housing comprises: (1) a beverage input which receives a beverage; (2) a beverage output which dispenses a beverage; and (3) a valve sub-assembly which regulates beverage flow, wherein the valve sub-assembly is associated with a beverage faucet lever as provided herein.

The present invention is also directed to, among other things, a tap marker mounting device, comprising: (a) an outer sleeve; (b) an inner sleeve, wherein at least a portion of the outer sleeve is spaced apart from the inner sleeve to define a cavity therebetween, wherein the inner sleeve is positioned at least partially within the outer sleeve, and wherein the inner sleeve comprises at least one aperture for receiving at least one tab, and further wherein the inner sleeve comprises a beverage faucet lever stop member; and (c) a compression spring, wherein the compression spring is position within the cavity.

In a preferred embodiment of the present invention, the inner sleeve of the tap marker mounting device further comprises a groove proximate an upper end thereof for receiving a clamp member.

In another preferred embodiment of the present invention, the inner sleeve of the tap marker mounting device further comprises a groove proximate a lower end thereof having a clamp member therein for retaining a lower end of the compression spring.

In yet another preferred embodiment of the present invention, the outer sleeve of the tap marker mounting device further comprises a lip proximate an upper end thereof for retaining an upper end of the compression spring.

In accordance with a preferred embodiment of the present invention, the tap marker mounting device further comprises tap marker associated with at least a portion of the inner sleeve.

The present invention is also directed to, among other things, a method for installing a tap marker mounting device to a beverage faucet, comprising the steps of: (a) removing a beverage faucet lever void of a tap marker alignment member; (b) inserting a beverage faucet lever having a tap marker alignment member; and (c) securing a tap marker mounting device having a tap marker to the inserted beverage faucet lever and, in turn, controllably aligning the tap marker.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted. It will be further understood that the invention is not necessarily limited to the particular embodiments illustrated herein.

The invention will now be described with reference to the drawings wherein.

DETAILED DESCRIPTION OF THE INVENTION

Figure 1:
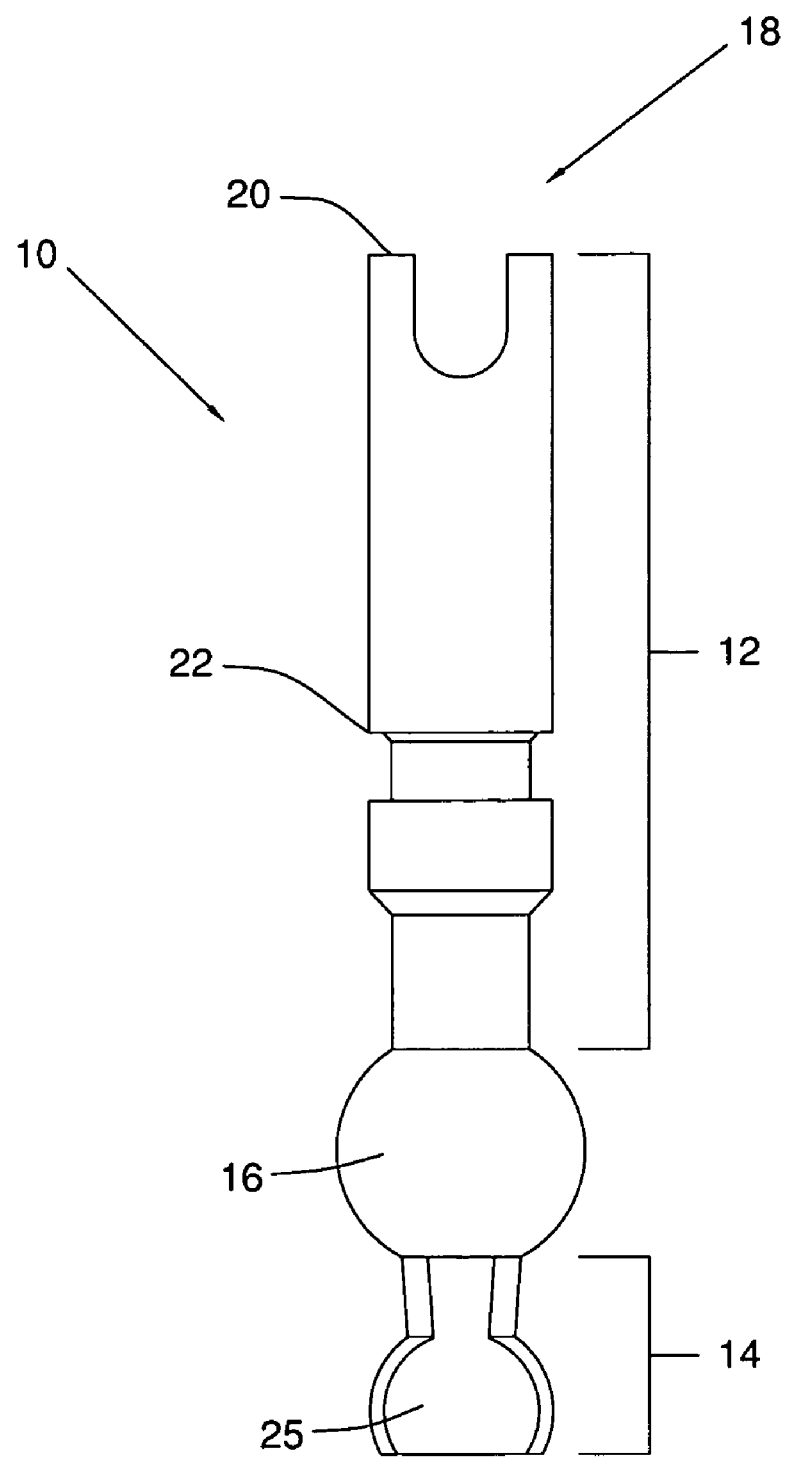
FIG. 1 of the drawings is a front plan view of a beverage faucet lever fabricated in accordance with the present invention.

While this invention is susceptible of embodiment in many different forms, there is shown in the drawings and will herein be described in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings with like reference characters.

Referring now to the drawings and to FIG. 1 in particular, a front plan view of beverage faucet lever 10 is shown, which generally comprises upper shaft 12, lower shaft 14, and ball joint 16.

For purposes of the present disclosure, upper shaft 12 generally comprises tap marker alignment member 18, top surface 20, and lip 22. Upper shaft 12 is shown in FIG. 1 as comprising a generally cylindrical geometry having one or more optional grooves and/or indentations. However, any one of a number of geometric configurations are likewise contemplated for use in accordance with the present invention, including threaded, partially-threaded, non-threaded, longitudinally planar, longitudinally non-planar—just to name a few. It will be understood that, during normal operation of an associated beverage faucet, upper shaft 12 of beverage faucet lever 10 is at least partially positioned within an associated tap marker mounting device. As will be discussed in greater detail infra, upper shaft 12 of beverage faucet lever 10 is preferably releasably secured within an inner sleeve of a tap marker mounting member.

Figure 2A:
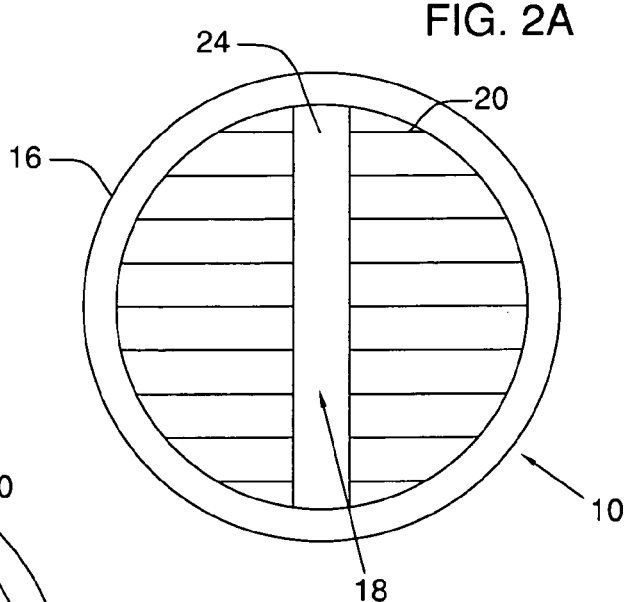
FIGS. 2A-2C of the drawings are top plan views of beverage faucet levers fabricated in accordance with the present invention.
Figure 2B:
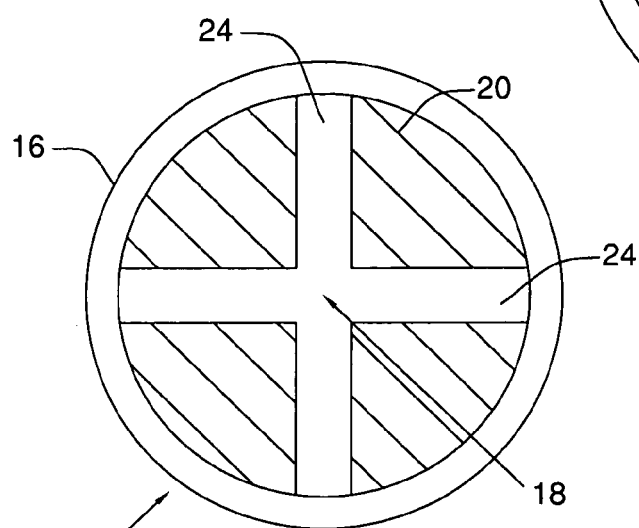
Figure 2C:
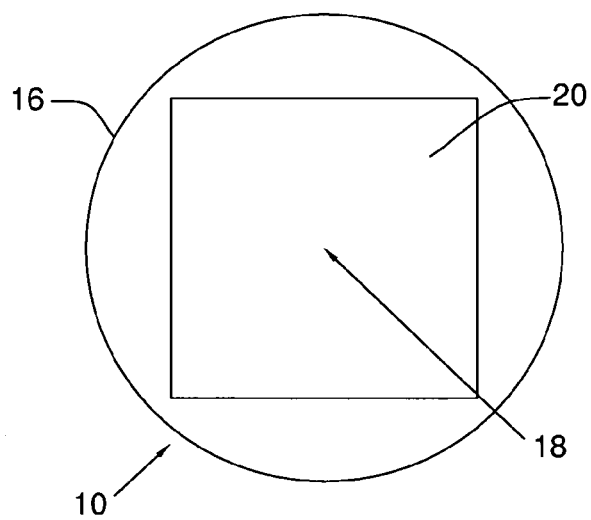

Referring now to FIGS. 1, 2A, 2B, and 2C, tap marker alignment member 18 preferably comprises top surface 20 having one or more female slot(s) 24. While tap marker alignment member 18 has been disclosed as comprising one or more female slots, it will be understood that male tabs, as well as other mating configurations, are likewise contemplated for use in accordance with the present invention. With reference to FIG. 2A it will be understood that such a single slot configuration enables a user to install a tap marker at 180 degree intervals (i.e. 0°, 180°) about beverage faucet lever 10 and, in turn, an associated beverage faucet. As is best shown in FIG. 2B tap marker alignment member 18 may comprise a pair of substantially orthogonal slots 24 positioned on a top surface 20 of upper shaft 12. Such an orthogonal slot configuration enables a user to install a tap marker at 90 degree intervals (i.e. 0°, 90°, 180°, 270°) about beverage faucet lever 10 and, in turn, an associated beverage faucet.

Preferably upper shaft 12 of beverage faucet lever 10 comprises a top surface 20 having a cross-sectional geometry selected from the group comprising circular, triangular, square, rectangular, pentagonal, hexagonal, octagonal, polygonal, and combinations thereof. It will be understood that the remainder of beverage faucet lever 10 may also comprise any one of the above-identified geometries.

As is best shown in FIG. 1, upper shaft 12 of beverage faucet lever 10 preferably comprises lip 22. Lip 22 provides a securement stop position for beverage faucet lever 10 when associated with a tap marker mounting device (e.g. FIGS. 4-5). In a preferred embodiment lip 22 is a constituent part of a circumferential cavity and/or groove for releasably receiving one or more tabs, such as ball bearings.

In accordance with the present invention, and as is best shown in FIG. 1, lower shaft 14 comprises actuator 25. It will be understood that lower shaft 14 is at least partially positioned within an associated beverage faucet—during normal operation. Actuator 25 is preferably in mechanical communication with a valve sub-assembly of an associated beverage faucet and serves to facilitate and/or regulate beverage flow from a beverage source, such as a hard line, keg, barrel, cooler, reservoir—just to name a few. It will be understood that actuator 25 may comprise any one of a number of geometries so long as the geometry is functionally operable with an associated valve sub-assembly.

Ball joint 16 of beverage faucet lever 10 is preferably positioned between upper shaft 12 and lower shaft 14, and is also preferably at least partially positioned within a beverage faucet during normal operation. Ball joint 16, among other things, serves to controllably retain fluid with an associated beverage faucet. Ball joint 16 also allows beverage faucet lever 10 to pivot about a specific point when the same is actuated.

Preferably, beverage faucet lever 10 is fabricated from a material selected from the group comprising steel, aluminum, metallic alloys, woods, natural and/or synthetic plastics and/or resins, and mixtures thereof.

Figure 3:
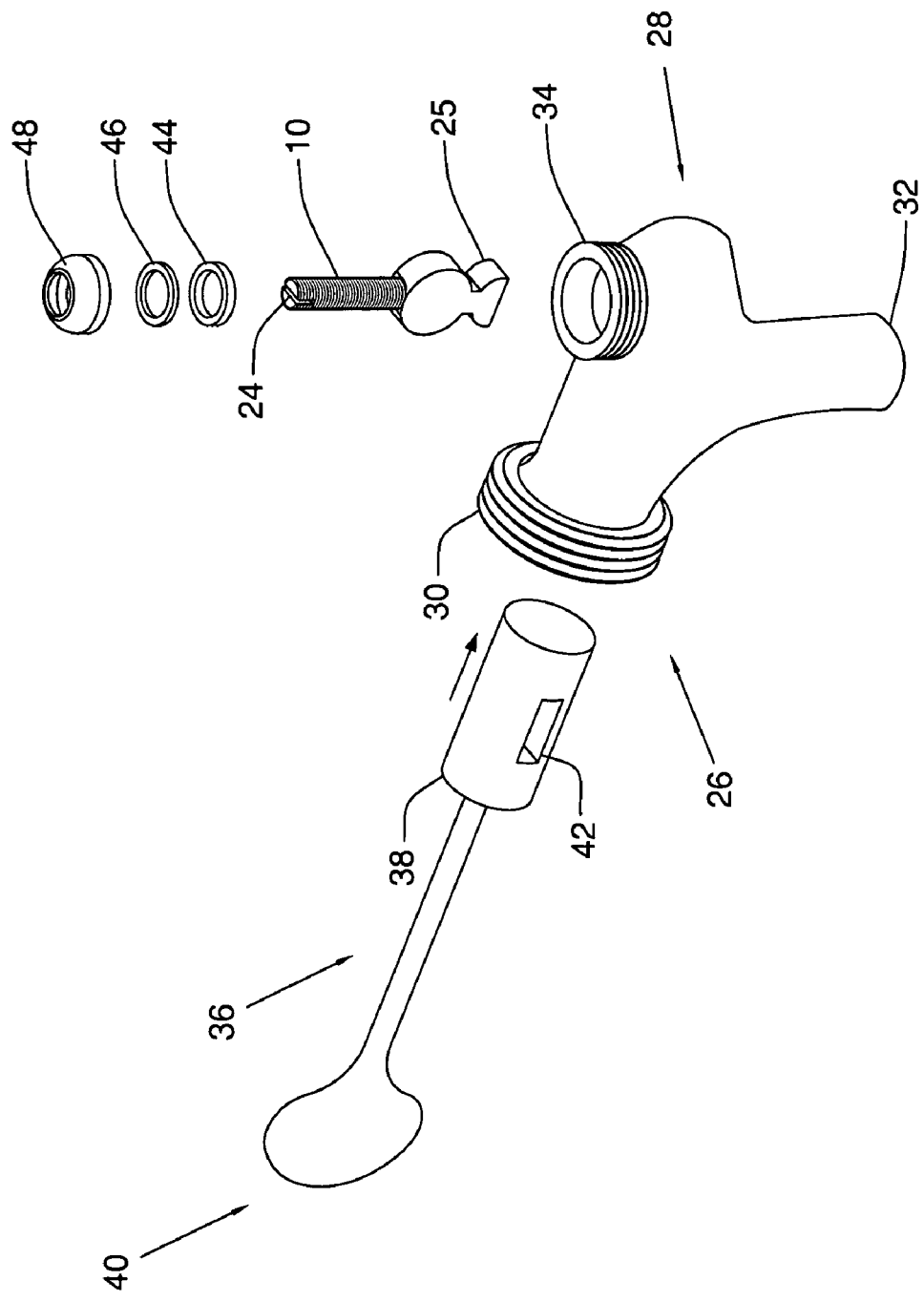
FIG. 3 of the drawings is an exploded perspective view of a beverage faucet fabricated in accordance with the present invention.

Referring now to FIG. 3, an exploded perspective view of beverage faucet 26 is shown which generally comprises housing 28, beverage input 30 for receiving a beverage, beverage output 32 for dispensing a beverage, lever stem 34, and valve sub-assembly 36 for regulating beverage flow. During normal use beverage faucet lever 10, having a tap marker alignment member, is associated with beverage faucet 26. It will be understood that any one of the beverage faucet levers disclosed herein is suitable for use in association with beverage faucet 26. It will be further understood that beverage faucet 26 serves to controllably facilitate and/or regulate beverage flow from a beverage source.

Valve sub-assembly 36 generally comprises stem 38 and plunger 40. Stem 38 of valve sub-assembly 36 is preferably fabricated with aperture 42. Aperture 42 receives actuator 25 of beverage faucet lever 10. Aperture 42 may comprise any geometric configuration, but will preferably mate geometrically with actuator 25 of beverage faucet lever 10.

In one embodiment of the present invention, beverage faucet 26 may also comprise washers 44 and 46, and cap 48, which cooperate together to ensure that beverage does not flow up through the lever stem 34 when beverage faucet lever 10 is displaced.

In operation, when a user displaces beverage faucet lever 10 forward, actuator 25 displaces valve sub-assembly 36 allowing beverage to flow through beverage input 30 through housing 28 and dispenses said beverage out of beverage output 32. Similarly, when a user displaces beverage faucet lever 10 backwards, actuator 25 displaces valve sub-assembly 36 preventing the beverage from flowing through beverage input 30.

Figure 4:
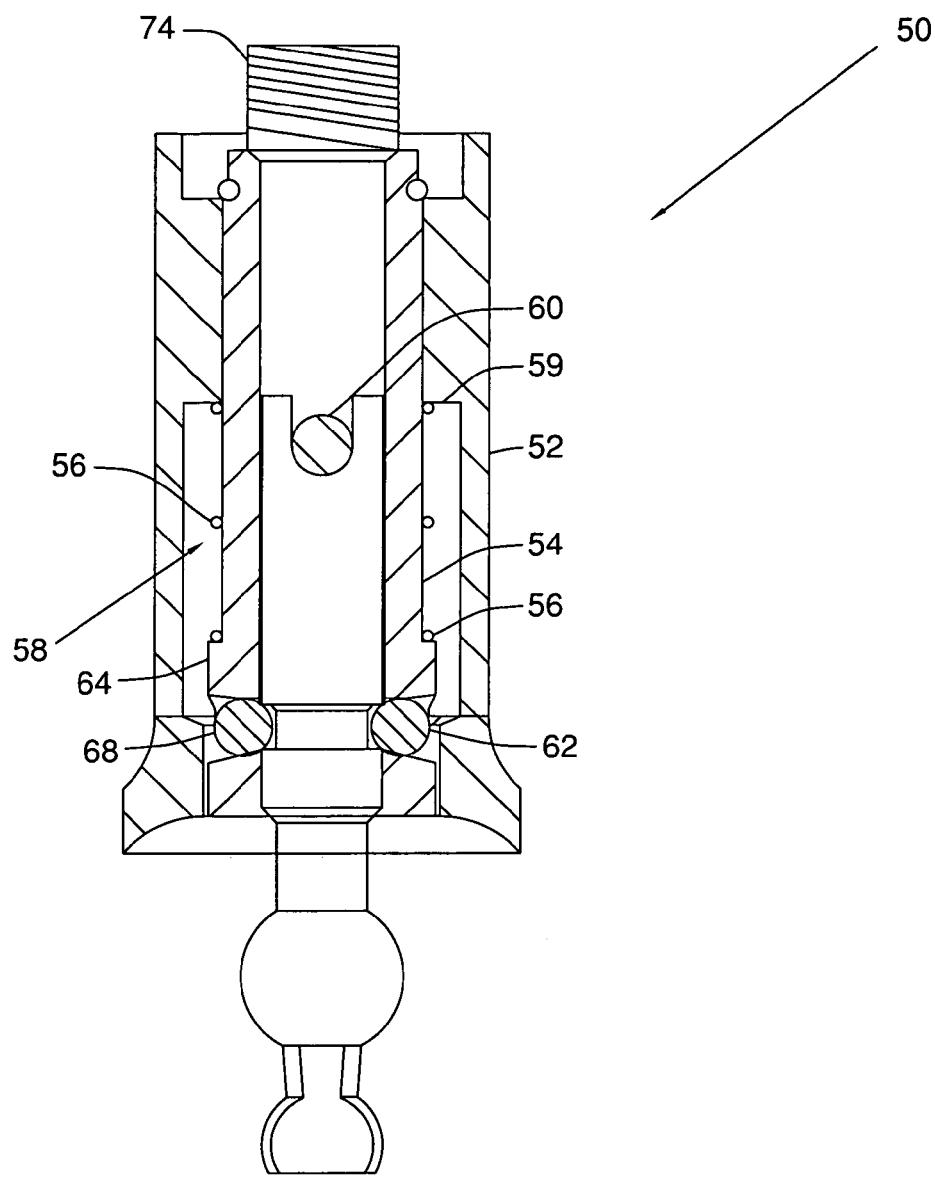
FIG. 4 of the drawings is a cross sectional view of a tap marker mounting member and a beverage faucet lever fabricated in accordance with the present invention.

Referring now to FIG. 4, a cross sectional view of tap marker mounting device 50 is shown which generally comprises outer sleeve 52, inner sleeve 54, and compression spring 56. It will be understood that at least a portion of outer sleeve 52 is spaced apart from inner sleeve 54 to define cavity 58 therebetween. During normal operation, the movement of outer sleeve 52 operates to engage (i.e. lock) and/or disengage (i.e. unlock) objects (i.e. beverage faucet lever) associated with inner sleeve 54.

For purposes of the present invention outer sleeve 52 preferably comprises lip 59 which serves to regulate the upper position of an associated compression spring. Lip 59 may be an integral part of outer sleeve 52, or may comprise, for example, clips which fit into grooves fabricated into the inner wall of outer sleeve 52, or collars which are press fit onto outer sleeve 52.

In accordance with the preset invention, cavity 58 preferably houses compression spring 56, and during normal operation of tap marker mounting device 50, a portion of one or more tabs (e.g. ball bearings) 62 as well.

Tap marker mounting device 50 also comprises inner sleeve 54 which preferably comprises beverage faucet lever stop member 60, optional sleeve collar 64, and apertures 68.

In accordance with the present invention, inner sleeve 54 of tap marker mounting device 50 includes beverage faucet lever stop member 60. Beverage faucet lever stop member 60 is configured to receive, or be received, by another alignment member (e.g. tap marker alignment member 18 of beverage faucet lever 10) associated with an object that is inserted into inner sleeve 54, such that a tap marker may be substantially and/or controllably aligned in one or more predetermined positions. Beverage faucet lever stop member 60 may comprise, for example, a bar, a rod, a detent, a catch, a male member, a female member, etcetera—the only limitation being that it preferably mechanically cooperates with a portion of tap marker alignment member 18.

Referring once again to FIG. 4, tap marker mounting device 50 may also include sleeve collar 64. Sleeve collar 64 is preferably press fitted onto inner sleeve 54 such that when outer sleeve 52 is displaced between a locked and an unlocked position, inner sleeve 54 does not disassociate from outer sleeve 52.

In one embodiment of the present invention, inner sleeve 54 also contains at least one, but preferably a plurality of apertures 68. Apertures 68 are preferably conical and in one embodiment, taper toward the inner wall of inner sleeve 54 in order to retain at least a portion of an associated tabs 62 within the apertures and substantially preclude an associated tabs 62 from completely passing through apertures 68 when no object is associated with inner sleeve 54.

Figure 5:
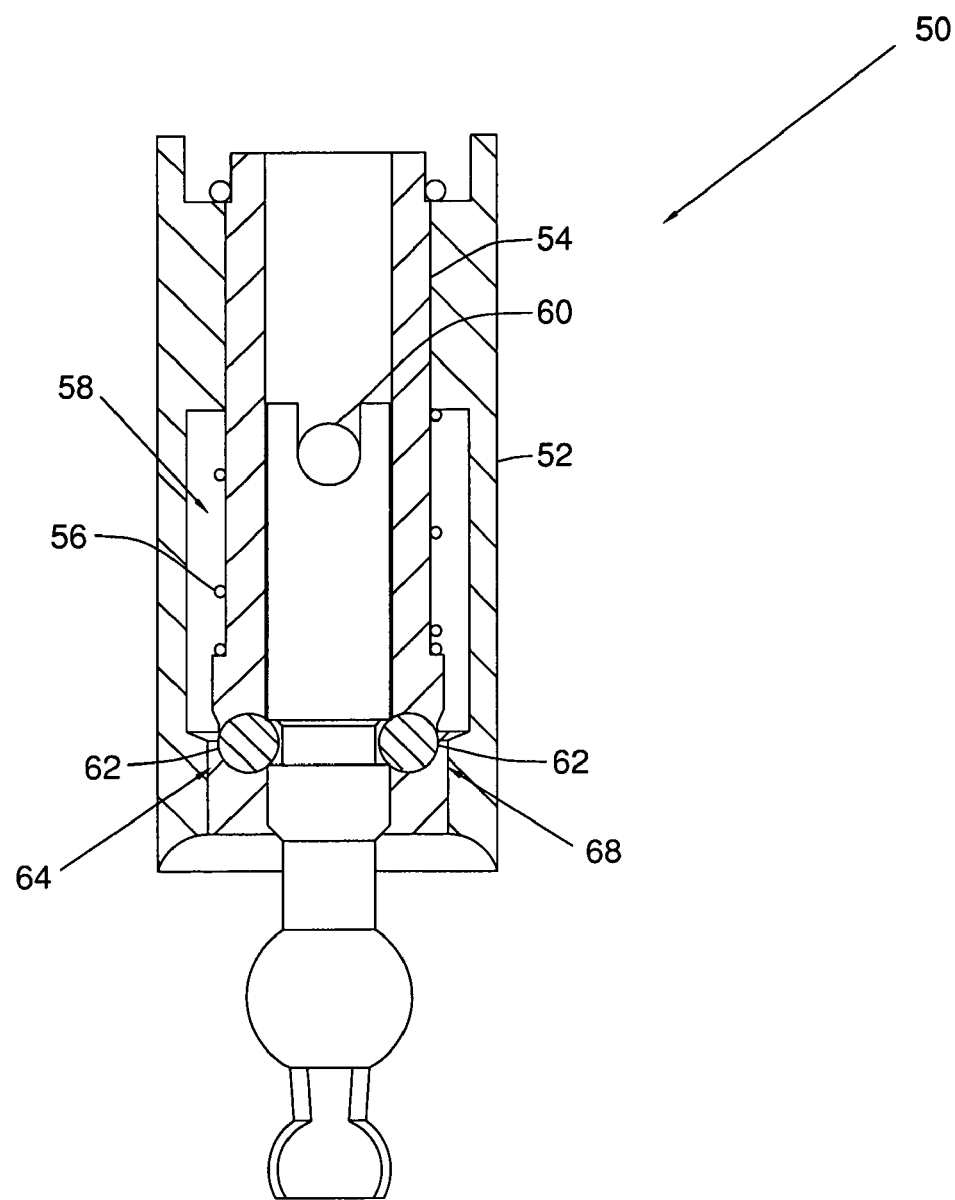
FIG. 5 of the drawings is a cross sectional view of a tap marker mounting member and a beverage faucet lever fabricated in accordance with the present invention.

Referring now to FIGS. 4 and 5 collectively, showing the connection between inner sleeve 54, outer sleeve 52, and tabs 62. In order to secure inner sleeve 54, and in-turn, tap marker mounting device 50 to an associated object, tabs 62 are utilized. Tabs 62 are shown as comprising a ball, or preferably, a plurality of balls. While tabs 62 have been shown, for illustrative purposes only, as comprising a circular geometry, it will be understood that numerous other tabbing configurations that would be known to those with ordinary skill in the art having the present disclosure before them are likewise contemplated for use.

By way of operation, it will be understood that when outer sleeve 52 is in a locked position, tabs 62 are compressed by the inner wall of outer sleeve 52 and partially displaced through apertures 68 on inner sleeve 54 or, alternatively within optional shaft collar 64. Conversely, when outer sleeve 52 is displaced to an unlocked position, tabs 62 displace vertically and when an object of sufficient size is inserted into inner sleeve 54, tabs 62 at least partially displace horizontally into cavity 58.

Inner sleeve 54 preferably comprises a series of threads at the top end of inner sleeve 54 which receive an associated tap marker. While threads have been shown, for illustrative purposes only, it will be understood that numerous other securing mechanisms/configurations that would be known to those with ordinary skill in the art having the present disclosure before them are likewise contemplated for use.

Referring now to FIG. 5, another embodiment of tap marker mounting device 50 is shown which is generally analogous to the device disclosed in FIG. 4 with the exception that the device in FIG. 5 is void of sleeve collar 64.

Figure 6:
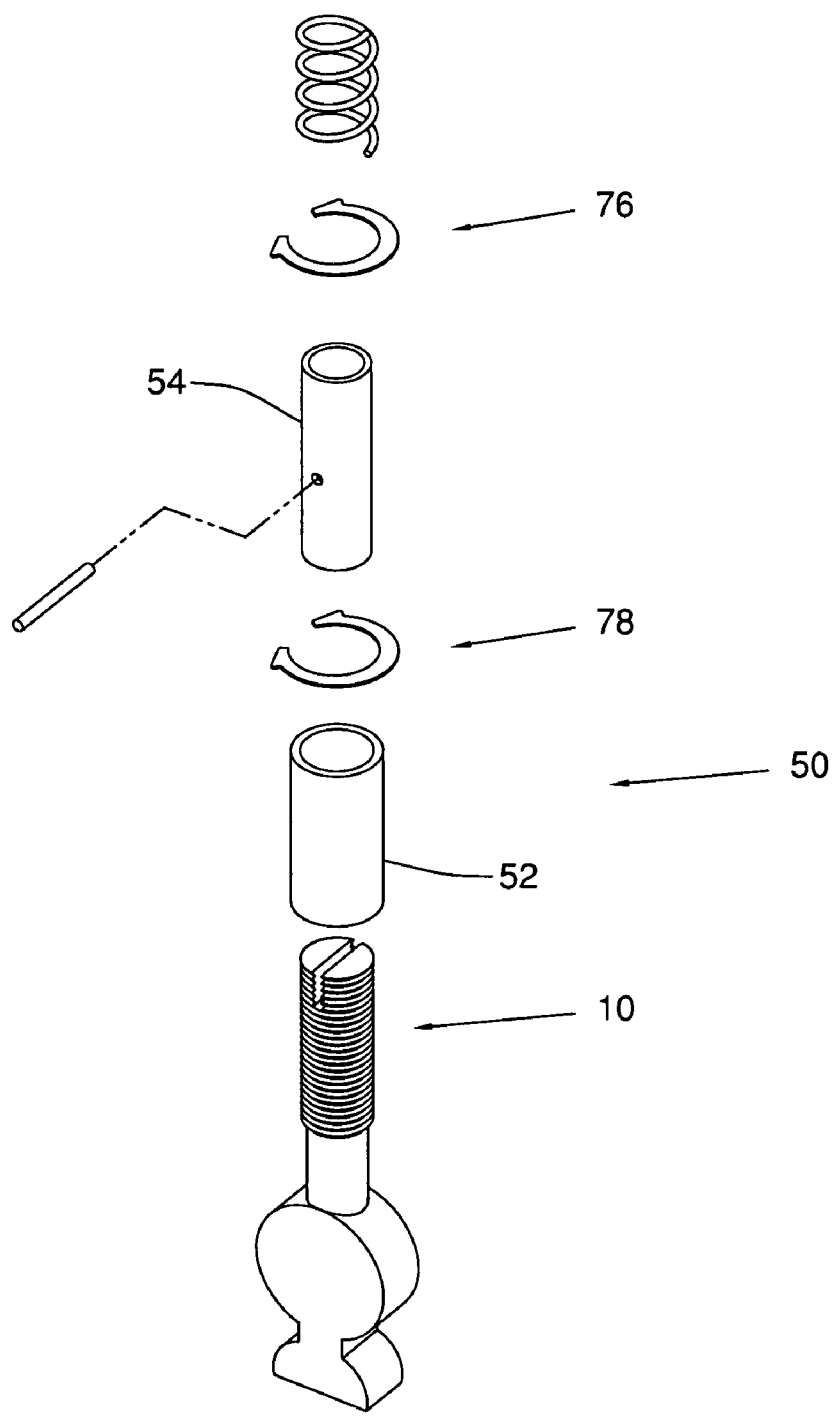
FIG. 6 of the drawings is an exploded perspective view of a tap marker mounting member fabricated in accordance with the present invention.

Referring now to FIG. 6, an exploded perspective view of tap marker mounting device 50 is shown as highlighting, among other things, c-shaped clips 76 and 78 which can be utilized to define the height of cavity 58—which is best shown in FIGS. 4 and 5. Clips 76 and 78 can also retain inner sleeve 54 within outer sleeve 52. C-shaped clip 76 on the upper region of inner sleeve 54 cooperates with lip 66 of outer sleeve 52 to retain inner sleeve 54 within outer sleeve 52. C-shaped clip 78 on the lower region of inner sleeve 54 cooperates with lip 66 of outer sleeve 52 in order to compress compression spring 56 when outer sleeve 52 is displaced to an unlocked position.

Figure 7:
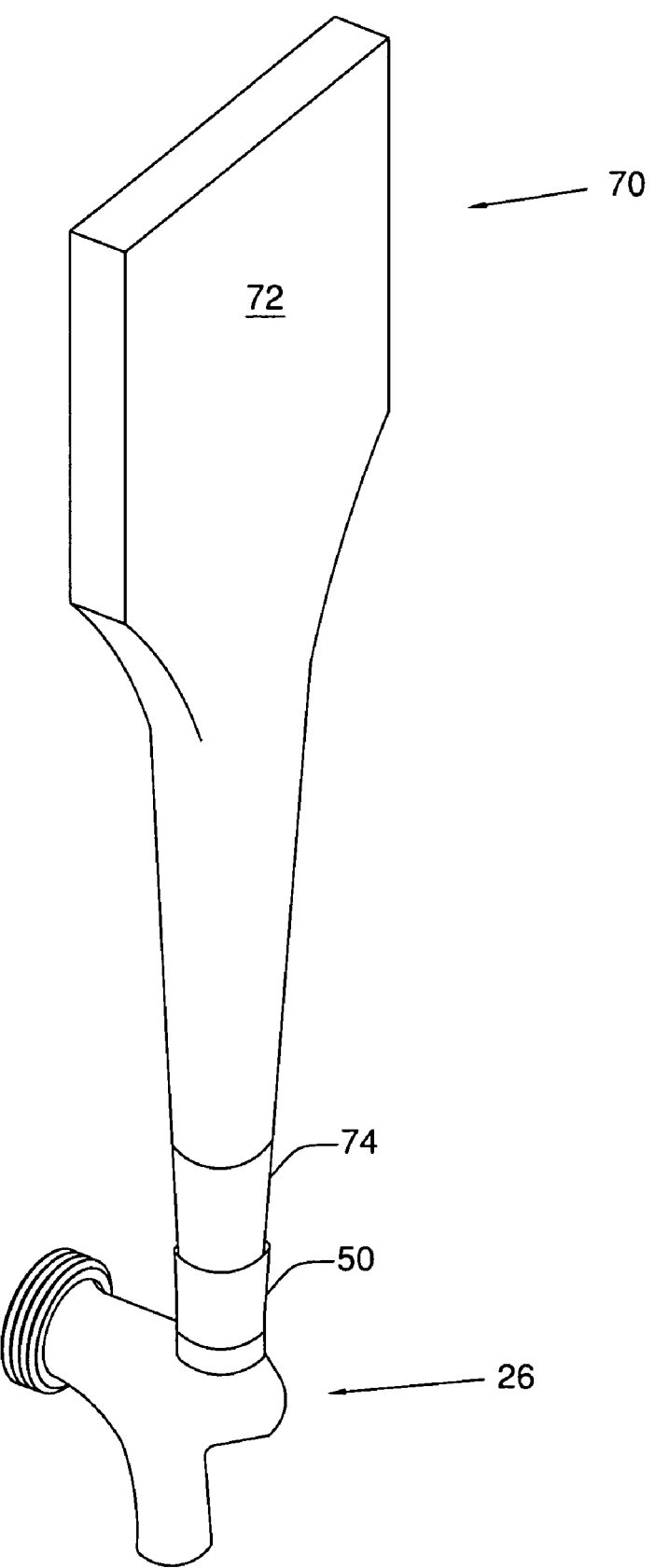
FIG. 7 of the drawings is a perspective view of a beverage faucet, tap marker mounting member, and a tap marker fabricated in accordance with the present invention.

Referring now to FIG. 7, a perspective view of tap marker 70 is shown as generally comprising body 72 and marker securing member 74. Body 72 may comprise any one of a number of geometric configurations. Marker securing member 74 is an optional structure and is shown as comprising a threaded shaft fixedly attached to body 70 and releaseably attachable to the top portion of tap marker mounting member 50. Although marker securing member 74 is shown as threaded onto inner sleeve 54 (best shown in FIG. 4), an ordinarily skilled artisan will appreciate that any one of a number of conventional attachment methods are contemplated for use in accordance with the present invention, including, but not limited to, welding, adhesives, compression fittings—just to name a few.

In operation, a user displaces outer sleeve 52, and therefore tap marker mounting member 50 to an unlocked position and places beverage faucet lever 10 into tap marker mounting member 50. It may be necessary to rotate tap marker 70 gently until beverage faucet lever stop member 60 and tap marker alignment member 16 mechanically communicate with one another, securing tap marker 70 into one of the predetermined alignment positions. It will be understood that if beverage faucet lever 10 is a conventional faucet lever, a modified faucet lever comprising a tap marker alignment member should be installed in place of the conventional faucet lever.

Once beverage faucet lever stop member 60 and tap marker alignment member 16 have been mechanically communicated (i.e. associated, joined, connected) a user then releases outer sleeve 52, thereby displacing tap marker mounting member 50 into a locked position. To remove tap marker 70, a user simply displaces outer sleeve 52 to an unlocked position and lifts tap marker 70 from beverage faucet lever 10.

The foregoing description merely explains and illustrates the invention and the invention is not limited thereto except insofar as the appended claims are so limited, as those skilled in the art who have the disclosure before them will be able to make modifications without departing the scope of the invention.

What is claimed:

1. A beverage faucet lever device, comprising:
    a tap marker,
    a tap marker mounting device,
    a beverage faucet lever comprising
        an upper shaft, wherein the upper shaft comprises a tap marker alignment member which provides rotational alignment of the tap marker, and wherein the upper shaft comprises a lip for engaging a tab of the tap marker mounting device, and further wherein the upper shaft is releasably secured within an inner sleeve of the tap marker mounting device;
        a lower shaft, wherein the lower shaft comprises an actuator and wherein the lower shaft is at least partially positionable within a beverage faucet; and
        a ball joint positioned between the upper shaft and the lower shaft, wherein the ball joint is at least partially positionable within the beverage faucet.

2. The beverage faucet lever according to claim 1, wherein the tap marker alignment member comprises a slot positioned on a top surface of the upper shaft.

3. The beverage faucet lever according to claim 1, wherein the tap marker alignment member comprises a plurality of slots positioned on a top surface of the upper shaft.

4. The beverage faucet lever according to claim 1, wherein the tap marker alignment member comprises a pair of substantially orthogonal slots positioned on a top surface of the upper shaft.

5. The beverage faucet lever according to claim 1, wherein the tap marker alignment member comprises a top surface of the upper shaft having a cross-sectional geometry selected from the group comprising triangular, square, rectangular, pentagonal, hexagonal, octagonal, and combinations thereof.

6. The beverage faucet lever according to claim 1, wherein the tap marker alignment member comprises a top surface of the upper shaft having a polygonal cross-sectional geometry.

7. The beverage faucet lever according to claim 1, wherein at least a portion of the upper shaft is threaded.

8. A beverage faucet, comprising:
    a housing, wherein the housing comprises:
        a beverage input which receives a beverage;
        a beverage output which dispenses a beverage; and
        a valve sub-assembly which regulates beverage flow, wherein the valve sub-assembly is associated with a beverage faucet lever device according to claim 1.

9. A beverage faucet, comprising:
    a housing, wherein the housing comprises:
        a beverage input which receives a beverage;
        a beverage output which dispenses a beverage; and
        a valve sub-assembly which regulates beverage flow, wherein the valve sub-assembly is associated with a beverage faucet lever device according to claim 2.

10. A beverage faucet, comprising:
    a housing, wherein the housing comprises:
        a beverage input which receives a beverage;
        a beverage output which dispenses a beverage; and
        a valve sub-assembly which regulates beverage flow, wherein the valve sub-assembly is associated with a beverage faucet lever device according to claim 3.

11. A beverage faucet, comprising:
    a housing, wherein the housing comprises:
        a beverage input which receives a beverage;
        a beverage output which dispenses a beverage; and
        a valve sub-assembly which regulates beverage flow, wherein the valve sub-assembly is associated with a beverage faucet lever device according to claim 5.

12. A beverage faucet lever, device, comprising:
    a tap marker,
    a tap marker mounting device,
    a beverage faucet lever comprising
        an upper shaft, wherein the upper shaft comprises a tap marker alignment member which provides rotational alignment of the tap marker, and wherein the upper shaft comprises a lip for engaging a tab of the tap marker mounting device, and further wherein the upper shaft is releasably secured within an inner sleeve of the tap marker mounting device;
        a lower shaft, wherein the lower shaft comprises an actuator and wherein the lower shaft is at least partially positionable within a beverage faucet;
        a ball joint positioned between the upper shaft and the lower shaft, wherein the ball joint is at least partially positionable within the beverage faucet; and
    wherein the tap marker alignment member comprises at least one of: a slot positioned on a top surface of the upper shaft; a plurality of slots positioned on the top surface of the upper shaft; a pair of substantially orthogonal slots positioned on the top surface of the upper shaft; and the top surface of the upper shaft having a cross-sectional geometry selected from the group comprising triangular, square, rectangular, pentagonal, hexagonal, octagonal, polygonal and combinations thereof.

13. A beverage faucet lever, consisting of:
    an upper shaft, wherein the upper shaft comprises a tap marker alignment member which facilitates rotational alignment of an associated tap marker, and wherein the upper shaft comprises a lip for engaging a tab of a tap marker mounting device, and further wherein the upper shaft is releasably secured within an inner sleeve of the tap marker mounting device;

a lower shaft, wherein the lower shaft comprises an actuator and wherein the lower shaft is at least partially positionable within a beverage faucet;

a ball joint positioned between the upper shaft and the lower shaft, wherein the ball joint is at least partially positionable within the beverage faucet; and wherein the tap marker alignment member comprises at least one of: a slot positioned on a top surface of the upper shaft; a plurality of slots positioned on the top surface of the upper shaft; a pair of substantially orthogonal slots positioned on the top surface of the upper shaft; and the top surface of the upper shaft having a cross-sectional geometry selected from the group comprising triangular, square, rectangular, pentagonal, hexagonal, octagonal, polygonal and combinations thereof.

\* \* \* \* \*